(12) United States Patent
Senyuta et al.

(10) Patent No.: US 9,631,255 B2
(45) Date of Patent: Apr. 25, 2017

(54) METHOD FOR PRODUCING ALUMINA

(75) Inventors: Aleksandr Sergeevich Senyuta, St. Petersburg (RU); Andrey Vladimirovich Panov, St. Petersburg (RU)

(73) Assignee: UNITED COMPANY RUSAL ENGINEERING AND TECHNOLOGY CENTRE LLPC, Kransnoyarsk (RU)

( * ) Notice: Subject to any disclaimer, the term of this patent is extended or adjusted under 35 U.S.C. 154(b) by 0 days.

(21) Appl. No.: 14/417,696

(22) PCT Filed: Aug. 1, 2012

(86) PCT No.: PCT/RU2012/000631
§ 371 (c)(1),
(2), (4) Date: Jan. 27, 2015

(87) PCT Pub. No.: WO2014/021730
PCT Pub. Date: Feb. 6, 2014

(65) Prior Publication Data
US 2015/0252447 A1 Sep. 10, 2015

(51) Int. Cl.
*C22B 21/00* (2006.01)
*C01F 7/30* (2006.01)
*C01F 7/56* (2006.01)
*C22B 7/00* (2006.01)

(52) U.S. Cl.
CPC .......... *C22B 21/0015* (2013.01); *C01F 7/306* (2013.01); *C01F 7/56* (2013.01); *C22B 7/007* (2013.01); *C01P 2006/80* (2013.01); *Y02P 10/234* (2015.11)

(58) Field of Classification Search
USPC ........................................ 423/625, 132, 636
IPC ......... C22B 3/10,21/0015, 7/007; C01F 7/306, 7/56
See application file for complete search history.

(56) References Cited

U.S. PATENT DOCUMENTS

| 4,080,437 A * | 3/1978 | Reh ............................. B01J 8/26 34/364 |
| 4,107,281 A * | 8/1978 | Reh .......................... C01F 7/306 34/363 |
| 4,158,042 A | 6/1979 | Deutschman |
| 4,486,402 A | 12/1984 | Gurtner et al. |

FOREIGN PATENT DOCUMENTS

| EP | 0094081 | 11/1983 |
| SU | 1258815 | 9/1986 |

OTHER PUBLICATIONS

D. Elsner et al., "Alumina via hydrochloric acid leaching of high silica bauxites—process development," Light Metals, 1984, pp. 411-426.

* cited by examiner

*Primary Examiner* — Steven Bos
(74) *Attorney, Agent, or Firm* — Hogan Lovells US LLP

(57) ABSTRACT

The invention relates to metallurgy, particular to acid methods for producing alumina, and can used in processing aluminum-containing raw materials, including those of a low-grade. The method for producing alumina comprises treating aluminum-containing raw materials with hydrochloric acid, separating aluminum chloride hexahydrate crystals from the supernatant chloride solution, and thermally decomposing said crystals in two stages to produce alumina. In order to increase the quality of alumina and decrease energy consumption while achieving high process productivity, water vapor is continuously introduced during the second stage of thermal decomposition, with a ratio of the total mass of the introduced water vapor to the mass of produced alumina equal to 0.2-5.7.

2 Claims, No Drawings

METHOD FOR PRODUCING ALUMINA

This application is a U.S. National Phase under 35 U.S.C. §371 of International Application PCT/RU2012/000631, filed on Aug. 1, 2012. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention is related to metallurgy, in particular to acid methods for producing alumina, and can be utilized in processing aluminum-containing raw material, including low-grade material.

A hydrochloric acid method for producing alumina is known by acid treatment of previously burned raw material, salting out with hydrogen chloride from the clarified solution of aluminum chloride hexahydrate ($AlCl_3 \cdot 6H_2O$) with its subsequent thermal decomposition to oxide at a temperature of 110-140° C. in the presence of aqueous vapour at a $H_2O:Al_2O_3$ ratio within the interval of (5.8-7.2):1 (SU, certificate of authorship No. 1258815, C01F 7/22, published Sep. 23, 1986). Such a method makes it possible to carry out the decomposition at low temperatures and to recover alumina mainly in the gamma modification and with a low residual chlorine content (0.0025-0.0030%). The operating parameters are selected with the purpose of associated regeneration of hydrochloric acid with a hydrogen chloride concentration of approximately 20%, which is returned to the acid treatment process.

Deficiencies of said method include the long duration, low productivity, and significant heat consumption for heating steam to the required temperature as it must be supplied during the entire process. Moreover, the 20% hydrochloric acid concentration supplied for acid treatment of the raw material is not optimal, and better results for transferring aluminum to solution are obtained with the use of a more concentrated acid.

The closest to the claimed method is a method for alumina production with hydrochloric acid treatment of the aluminum-containing raw material, extraction of aluminum chloride hexahydrate crystals from the clarified chloride solution, and two-stage thermal decomposition thereof with the production of smelter grade alumina (Elsner D., Jenkins D. H. and Sinha H. N. Alumina via hydrochloric acid leaching of high silica bauxites—process development. Light metals, 1984, p. 411-426). According to the method, the obtained aluminum chloride hexahydrate crystals were subjected in stage one to thermal decomposition at 200-250° C. using indirect heating until the formation of aluminum oxychlorides, and then, in stage two up to 1000° C. via furnace gas with production of industrial alumina.

The deficiencies of said method include the high chlorine content (0.03%) in the product which exceeds the limit values allowable for smelter grade alumina by about 3 times. Thermal energy consumption with this method of $AlCl_3 \cdot 6H_2O$ decomposition reaches 15 GJ per 1 tonne of alumina recovered. Heating of the material to 1000° C. under such conditions results in an increase in the alpha phase in alumina (70% and above), which makes the product unsuitable for metallurgical purposes. The high process temperature increases the heat losses to the environment.

The object of the invention is to develop a hydrochloric acid method for producing smelter grade alumina from low-grade raw material as well, thus allowing the processing of low-grade, high-silica ores and waste.

The technical result is to increase the alumina quality and to reduce power consumption at a high process productivity.

The above technical result is achieved in that in the method for producing alumina, comprising treating the aluminum-containing raw material with hydrochloric acid, separating the aluminum chloride hexahydrate crystals from the clarified chloride solution, and thermally decomposing said crystals in two stages to produce alumina production, in the thermal decomposition of stage two, aqueous vapour is supplied continuously at a ratio of the total vapour weight supplied to the weight of produced alumina of 0.2-5.7.

The positive effect of aqueous vapour introduction begins to appear at a value of 0.2 within the interval claimed. At a value of 5.7 it reaches the maximum and a further increase in vapour consumption results in nonproductive heat losses.

The thermal decomposition of aluminum chloride hexahydrate is a variant of its hydrolysis (thermal hydrolysis), but in technical literature it is usually called calcination and is represented by the following equation $$2AlCl_3 \cdot 6H_2O = Al_2O_3 + 6HCl + 9H_2O. \quad (1)$$

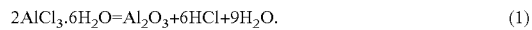

Actually, the process passes through an intermediate series of reactions of basic aluminum chlorides (oxychlorides) with a different basicity and level of hydration. Some of these intermediate and not always consecutive reactions can be written as follows:

$$AlCl_3 \cdot 6H_2O \rightarrow Al(OH)Cl_2 + 5H_2O + HCl, \quad (2)$$

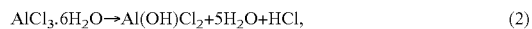

$$Al(OH)Cl_2 + H_2O \rightarrow Al(OH)_2Cl + HCl, \quad (3)$$

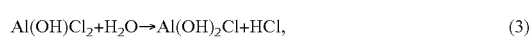

$$2Al(OH)_2Cl + H_2O \rightarrow Al_2(OH)_5Cl + HCl, \quad (4)$$

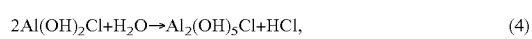

$$Al_2(OH)_5Cl + H_2O \rightarrow 2Al(OH)_3 + HCl, \quad (5)$$

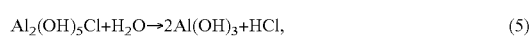

Reaction (2) proceeds with the release of water, which, according to the stoichiometry, should suffice with an excess for completing the overall reaction (1). But, according to literature data and the results of our own research, at temperatures of 100-500° C. the process terminates when the material is a mixture of aluminum oxychlorides, because water in the form of vapour is quickly removed from the reaction area without managing to react with the intermediate products of decomposition in reactions (3)-(5). Further reactions are possible only with an increase in the temperature to 900-1000° C. in the presence of furnace gases as implemented in the prior art. Notably, water contained in the products of organic fuel combustion plays an essential role here. Nevertheless, this aqueous vapour is not sufficient for a rapid and effective completion of alumina formation.

The situation changes fundamentally if upon completion of the aluminum oxychloride formation stage, water in the form of vapour is forcibly added to the process. Then reactions (3)-(5) run smoothly and aluminum oxide forms according to the hydrothermal mechanism as described in the related art. The hydrolysis with a surplus of water proceeds intensely and irreversibly; for this reason, the residual chlorine concentration in the final product is minimal like the alpha phase content, as the conditions for its formation are extremely limited. The necessity of conducting phase two at a high temperature no longer exists. As a result, an approximately twofold reduction of the heat energy consumption is achieved.

The method for producing alumina is carried out as follows.

Aluminum-containing raw material is leached with hydrochloric acid, the solid phase is removed, and the aluminum chloride hexahydrate crystals are separated by evaporating the clarified chloride solution or salting out with gaseous hydrogen chloride. The isolated crystals are then heated in any furnace at a temperature of 110-250° C. until the formation of aluminum oxychlorides and noticeable slowing of further chemical transformations due to depletion of water released during dehydration of the original product (stage one). After that, aqueous vapour is supplied to the furnace at a ratio of the total weight of vapour supplied to the weight of produced alumina of 0.2-5.7, and the process is completed (stage two). It is sufficient if the temperature in stage two is maintained at the level of 150-450° C., which reduces heat consumption significantly, and the stated ratio of the total weight of vapour supplied to the weight of produced alumina of about 0.2-5.7 makes it possible to minimise the heat used for overheating the vapour depending on the type of furnace selected, as the conditions of solid material interaction with the gaseous (vapour) phase are different.

Supplying the aqueous vapour only in stage two of aluminum chloride hexahydrate decomposition makes it possible to reduce vapour consumption at a high alumina quality and process productivity. A preliminary assessment shows that this method allows reducing the total consumption of thermal energy during the decomposition of aluminum chloride hexahydrate by 1.5-2 times.

The method for producing alumina is illustrated by the following examples.

A weighed quantity of kaolin clay of 100 g with the following content of basic components, %: $Al_2O_3$ 36.4; $SiO_2$ 45.3; $Fe_2O_3$ 0.78; $TiO_2$ 0.51; CaO 0.96; MgO 0.49, was mixed with 25% hydrochloric acid solution at a liquid to solid ratio L:S=4:1, placed into Teflon-coated autoclave, and kept at 180° C. for 3 hours with stirring. Upon process completion, the obtained slurry was filtered, and the clarified chloride solution was bubbled with gaseous hydrogen chloride until aluminum chloride hexahydrate crystals appeared; the crystals were rinsed with 38% hydrochloric acid on a filter. A total of 1513 g of $AlCl_3 \cdot 6H_2O$ was obtained. The crystals were placed in a laboratory tube furnace heated to 200° C., and kept therein for 0.5 hours, which completed decomposition stage one. After this, the furnace was blown through with aqueous vapour from a flask with boiling water, which completed stage two of decomposition. The vapour consumption was determined from the weight of the evaporated water, while the effort was made to maintain the claimed ratio of the total weight of vapour supplied to the weight of produced alumina within the range of 0.2-5.7. The duration of stage two did not exceed 0.5 hours.

In successive tests, the conditions of stage two were varied. The test results are presented in the table of examples, which shows that according to current requirements for smelter grade alumina (alpha phase content no more than 10%, chlorine content no more than 0.01%), examples 1, 2 and 12 did not allow the production of a completely good quality product. The rest of the examples produced positive results.

Each type of furnace requires the selection of optimum operation parameters based on the temperature and material dwell time, as well as on the quantity of aqueous vapour to be supplied to the process, so as to assure at the same time the alumina quality, process productivity, and the minimally possible thermal energy consumption. It should be noted that the conditions for the laboratory tube furnace for contact between the vapour phase and solid material are least favourable as compared with industrial furnaces where principles of material charging or suspended layer are realised, but the advantages of the method claimed in comparison with the prior art are obvious.

For the industrial implementation of the method, utilisation of two sequential furnace units is advisable to allow two-stage decomposition of aluminum chloride hexahydrate to be run continuously with an aqueous vapour supply only to unit two.

Method for Producing Alumina

TABLE

| Example | Conditions of stage 2 of decomposition $AlCl_3 \cdot 6H_2O$ | | Alumina phase composition | Chlorine content in alumina, % |
|---|---|---|---|---|
| | Temperature, ° C. | Dwell time, minutes | | |
| 1 | 150 | 20 | gamma | 0.052 |
| 2 | 150 | 40 | gamma | 0.023 |
| 3 | 150 | 60 | gamma | 0.009 |
| 4 | 250 | 20 | gamma | 0.010 |
| 5 | 250 | 40 | gamma and alpha traces | 0.008 |
| 6 | 250 | 60 | gamma and alpha traces | 0.004 |
| 7 | 350 | 20 | gamma and alpha traces | 0.004 |
| 8 | 350 | 40 | gamma and alpha traces | 0.0035 |
| 9 | 350 | 60 | gamma and 1-2% alpha | 0.0032 |
| 10 | 450 | 20 | gamma and 3% alpha | 0.0028 |
| 11 | 450 | 40 | gamma and 6% alpha | 0.0023 |
| 12 | 450 | 60 | gamma and 12% alpha | 0.0023 |

The invention claimed is:

1. A method of alumina recovery from an aluminum containing raw material comprising the following steps:
   (i) leaching the aluminum containing raw material with hydrochloric acid to form a supernatant solution of aluminum chloride hexahydrate;
   (ii) removing any solids from the supernatant solution of step (i);
   (iii) extracting aluminum chloride hexahydrate crystals from the supernatant solution;
   (iv) heating the aluminum chloride hexahydrate crystals from step (iii) to between 110 and 250° C. in a first heating stage until aluminum oxychlorides form and there is a depletion of water released during the first heating stage; and
   (v) treating the product of step (iv) to between 150 and 450° C. and delivering water vapour to the product of step (iv) at a ratio of a total weight of the water vapour to a weight of recovered alumina from 0.2-5.7 to recover alumina from the aluminum containing raw material.

2. The method of claim 1 wherein step (iii) is carried out by evaporation or by salting out using gaseous hydrogen chloride.

* * * * *